(12) United States Patent
Wang

(10) Patent No.: US 8,540,597 B2
(45) Date of Patent: Sep. 24, 2013

(54) CONNECTION UNIT OF A CHAIN

(76) Inventor: Wen-Pin Wang, Tainan Hsien (TW)

( * ) Notice: Subject to any disclaimer, the term of this patent is extended or adjusted under 35 U.S.C. 154(b) by 991 days.

(21) Appl. No.: 12/572,500

(22) Filed: Oct. 2, 2009

(65) Prior Publication Data

US 2011/0081195 A1 Apr. 7, 2011

(51) Int. Cl.
*F16G 15/12* (2006.01)
*F16G 13/02* (2006.01)
*F16C 11/00* (2006.01)
*F16C 11/04* (2006.01)

(52) U.S. Cl.
USPC ............. 474/219; 403/154; 403/118

(58) Field of Classification Search
USPC .......... 474/217, 219, 220, 227; 403/119, 403/154; 59/84, 85
See application file for complete search history.

(56) References Cited

U.S. PATENT DOCUMENTS

| 5,362,282 A * | 11/1994 | Lickton ................ 474/220 |
| 7,712,298 B1 * | 5/2010 | Wang .................... 59/85 |
| 7,722,492 B2 * | 5/2010 | Santos ................... 474/227 |
| 2001/0046917 A1 * | 11/2001 | Linnenbrugger et al. .... 474/215 |
| 2007/0197333 A1 * | 8/2007 | Santos ................... 474/227 |

* cited by examiner

*Primary Examiner* — William E Dondero
*Assistant Examiner* — Robert T Reese
(74) *Attorney, Agent, or Firm* — Rosenberg, Klein & Lee

(57) ABSTRACT

A connection unit of a chain includes two outer link plates each having a first hole and a second hole. The second hole has a first recess and a second recess which communicates with the first recess. The first recess has a diameter larger than that of the second recess. The second recess includes an inner surface and a stepped engaging surface which is perpendicular to the inner surface. A stop surface is perpendicularly connected to the engaging surface. At least one first protrusion extends from the inner surface. A pin is securely fixed in the first hole and includes an engaging portion. A neck is located beside the engaging portion and has a diameter smaller than that of the engaging portion.

14 Claims, 10 Drawing Sheets

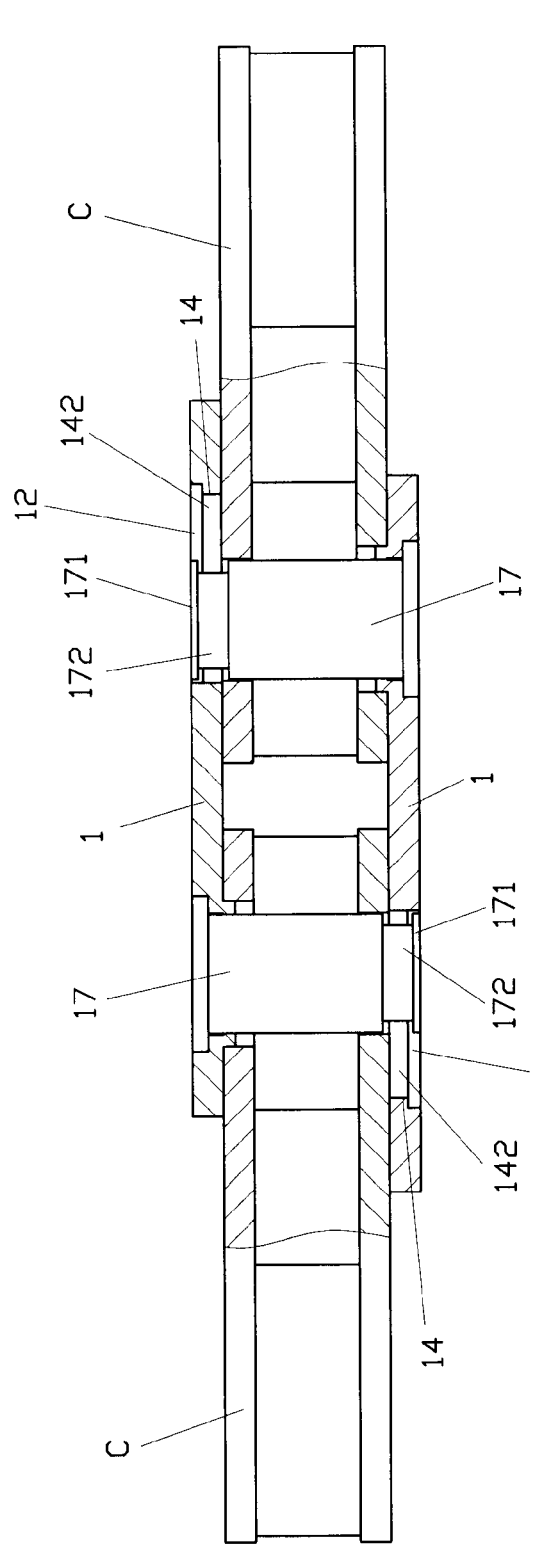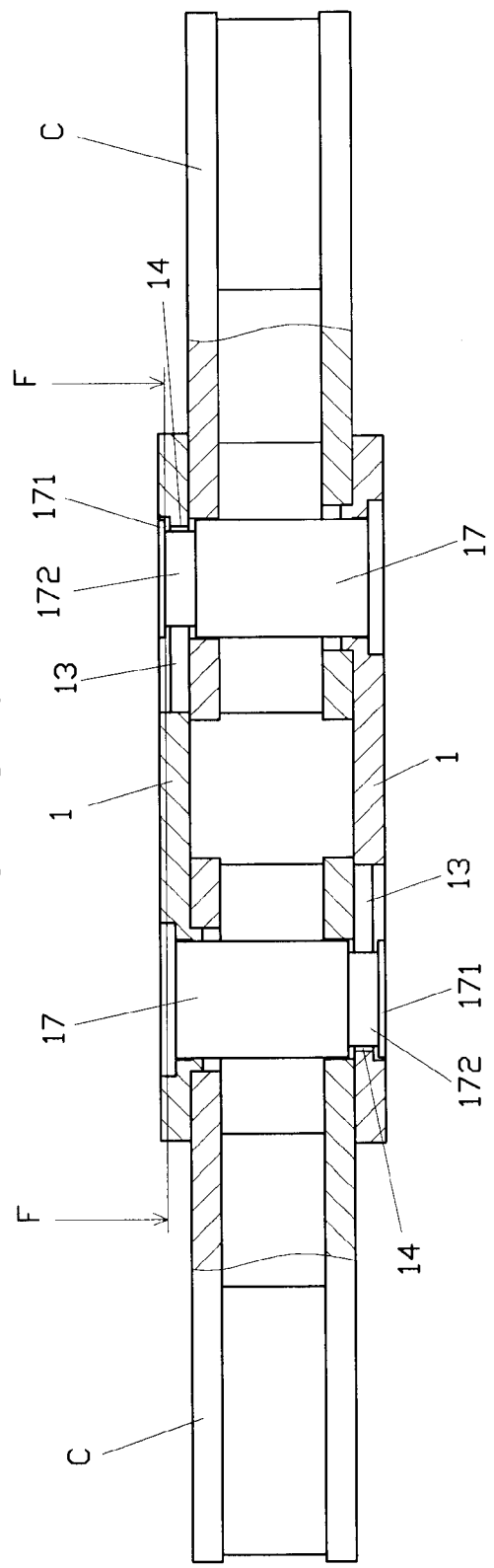

F - F

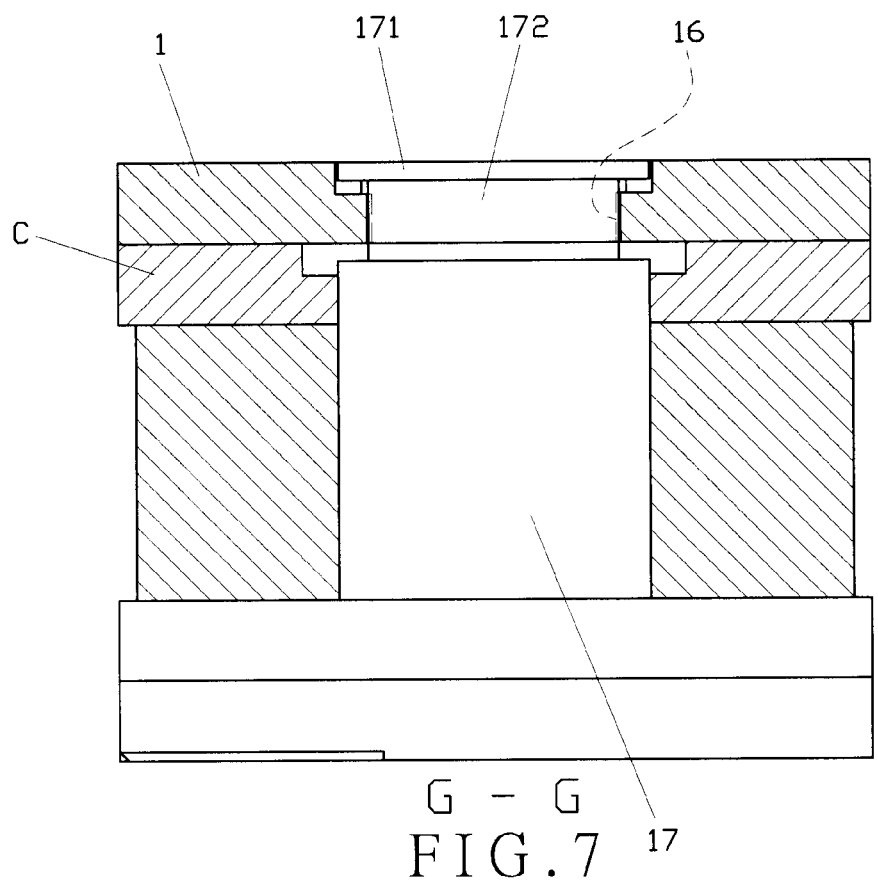
FIG. 7  G - G
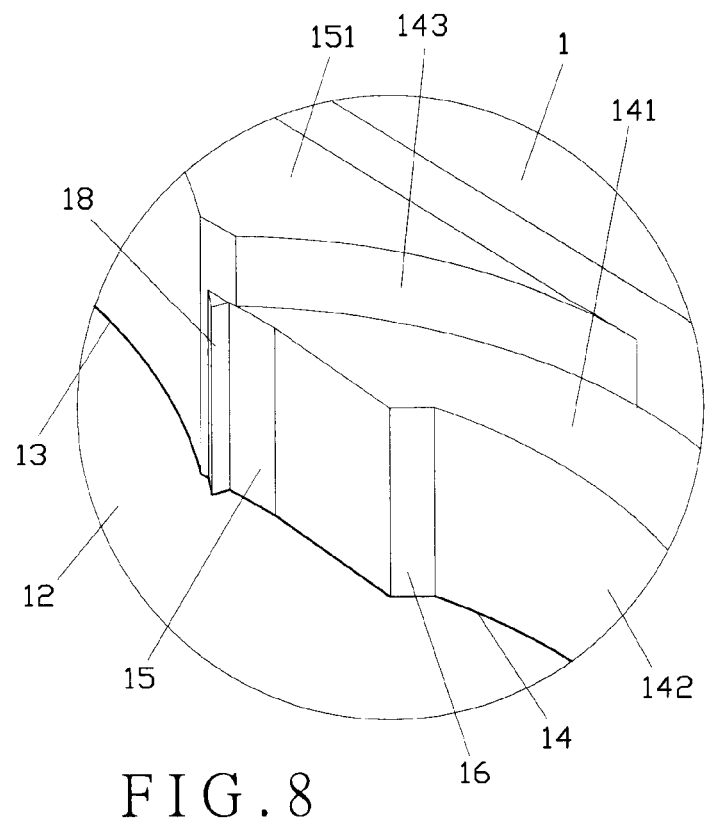
FIG. 8

CONNECTION UNIT OF A CHAIN

FIELD OF THE INVENTION

The present invention relates to a connection unit of a chain, and more particularly, to one using a protrusion protruding from an inside of the hole of an outer link plate to engage with a neck of a pin of another outer link plate to ensure that the two outer link plates are securely connected to each other.

BACKGROUND OF THE INVENTION

A conventional chain structure is disclosed in Taiwan Patent No. I276751 as shown in FIGS. 14 and 15, and generally includes two pins A2, A3 connected between two inner link plates A1 so as to form a connection unit A. A number of connections A are connected together to form a chain. Two outer link plates B are connected to the two connection units A by engaging with the pin A3, wherein the pin A3 includes a fixing portion A31 and an engaging portion A32 on two opposite ends thereof. The engaging portion A32 includes a narrow neck A33. Each of the two outer link plates B includes a first hole B1 and a second hole B2 which is located at a distance. The fixing portion A31 of the pin A3 is engaged with the first hole B1. The second hole B2 includes a first recess B21 and a second recess B22. The first recess B21 communicates with the second recess B22 and has a diameter larger than that of the recess B22. The engaging portion A32 extends through the first recess B21. The second recess B22 is wider than the neck A33 and includes an engaging surface B23 located in an inner periphery thereof. A vertical stop surface B24 extends from the engaging surface B23.

When assembling the chain, the fixing portions A31 of the two pins A3 are connected to the outer link plates B and the connection unit A is connected to the two pins A3. Then the two outer link plates B are assembled, the engaging portions A32 of the two pins A3 are inserted into the first recesses B21 of the second holes B2, and the engaging portions A32 protrude from the outer link plates B. The engaging portions A32 are then shifted toward the engaging surfaces B23 and then pressed downward to engaging the engaging portions A32 with the engaging surfaces B23 and stopped by the stop surfaces B24. The two outer link plates B are connected to each other and the inner link plates A1 of the connection unit A. A gap D is defined between the inner link plate A1 and the adjacent outer link plate B. Because the adjacent inner link plate A1 and the outer link plate B are connected by the engagement between the first recess B21 and the second recess B22 so that the pin A3 and the outer link plate B tend to shift relative to each other during operation. There is an axial force applied to the pin A3 when shifting the gears and the force could pull the engaging portion A32 out from the stop surface B24. The pin A3 moves toward the first recess B21 and could disengage from the outer link plate B to cause safety problems.

SUMMARY OF THE INVENTION

The present invention relates to a connection unit of a chain and includes two outer link plates each having a first hole and a second hole. The second hole has a first recess and a second recess which communicates with the first recess. The first recess has a diameter larger than that of the second recess. The second recess includes an inner surface and a stepped engaging surface which is perpendicular to the inner surface. A stop surface is perpendicularly connected to the engaging surface. At least one first protrusion extends from the inner surface. A pin is securely fixed in the first recess and includes an engaging portion. A neck is located beside the engaging portion and has a diameter smaller than that of the engaging portion.

Preferably, the first recess and the second recess have two opposite conjunction surfaces each formed at the conjunction of two respective contact lines of the first and second recesses.

Preferably, at least one of the conjunction surfaces is formed with a second protrusion.

Preferably, there are two first protrusions and the diameter of the neck of the pin is larger than a width between the two first protrusions.

Preferably, a flat surface is perpendicularly connected to the conjunction surfaces and located at the conjunction of the two respective contact lines of the first and second recesses, and the flat surface is higher than the engaging surface.

Preferably, the flat surface is inclined.

Preferably, there are two second protrusions and the diameter of the neck of the pin is larger than a width between the two second protrusions.

Preferably, a second protrusion extends from a conjunction between two respective contact lines of the first and second recesses.

Preferably, a flat surface is formed on top of the second protrusion and located at the conjunction of the two respective contact lines of the first and second recesses, and the flat surface is higher than the engaging surface.

Preferably, there are two second protrusions and the diameter of the neck of the pin is larger than a width between the two second protrusions.

Preferably, the engaging surface faces a center of the second recess and is an inclined surface, and a bottom of the engaging portion of the pin is shaped to be engaged with the inclined engaging surface.

The present invention has the following advantages:

The outer link plate includes at least one first protrusion so as to engage with the neck of the pin on the other outer link plate.

When the chain is not applied by an exterior torque, the engagement between the first protrusion and the neck of the pin on the other outer link plate secures the outer link plates not to be separated. When an exterior torque is applied to the chain and the pin shifts axially, the engaging portion is separated from the engaging surface and the stop surface and shifts toward the first recess. The first protrusion is adapted to engage with the neck of the pin to avoid the pin from disengaging from the chain.

The chain of the present invention includes at least one second protrusion so that even if the first protrusion is disengaged from the neck of the pin, the second protrusion is used to engage with the neck for providing a safe and secure connection to the outer link plates so as to ensure safe riding of bicycles.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3 is a cross sectional view to show that the two outer link plates are assembled to form the chain composed of the connection units according to the first embodiment of the present invention;

FIG. 4 is a cross sectional view to show that the two outer link plates are engaged according to the first embodiment of the present invention;

FIG. 7 is a cross sectional view taken along line G-G in FIG. 6;

FIG. 8 is an enlarged view to show the first and second protrusions according to a second embodiment of the present invention;

DETAILED DESCRIPTION OF THE PREFERRED EMBODIMENT

Figure 1:
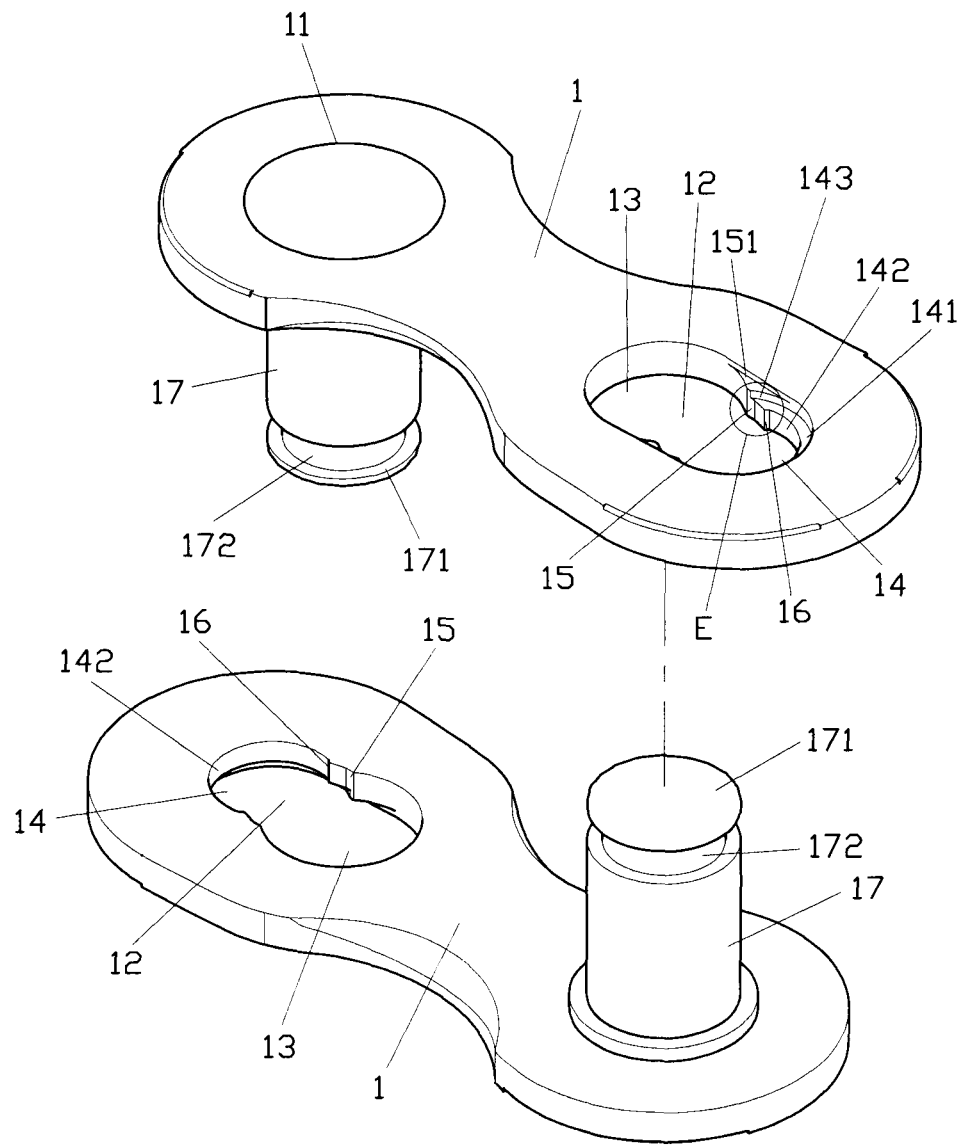
FIG. 1 is an exploded view to show the connection unit according to a first embodiment of the present invention.
Figure 2:
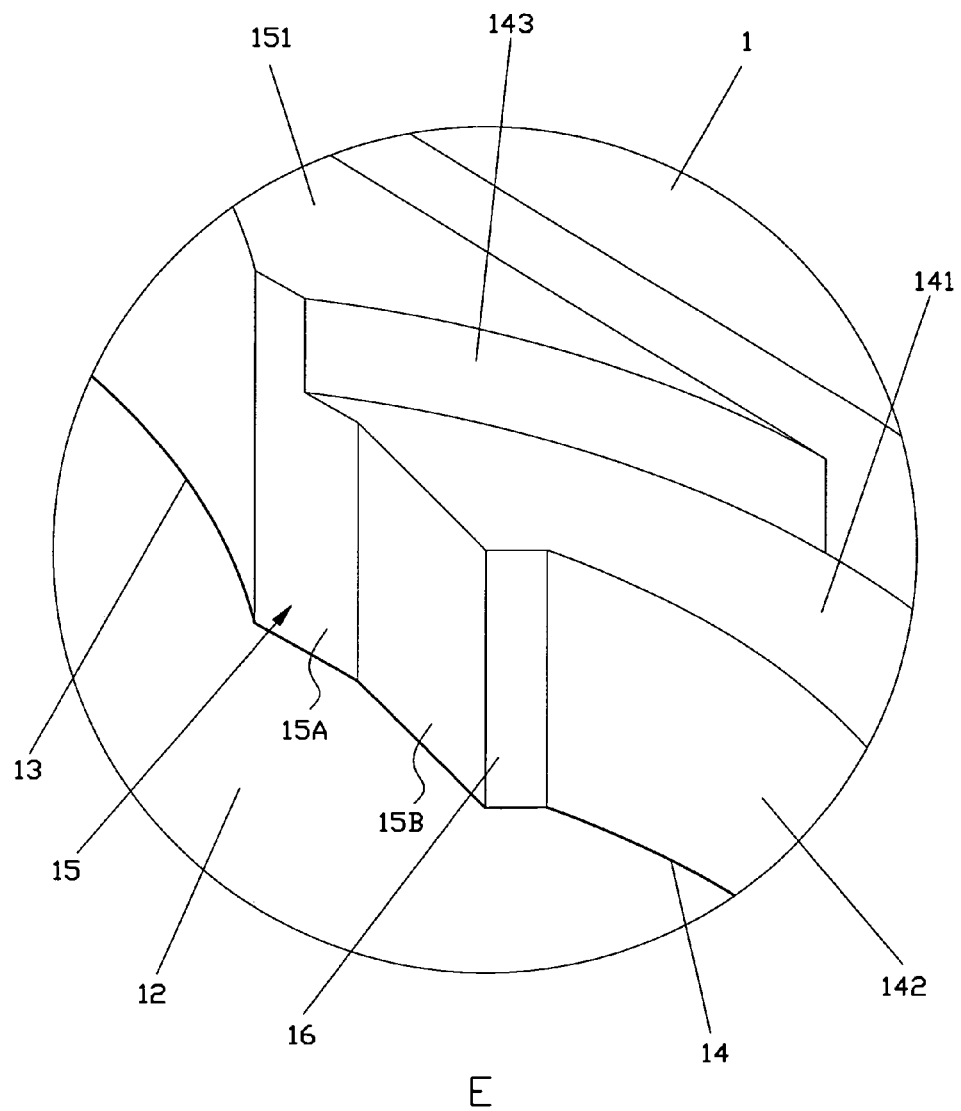
FIG. 2 is a partially enlarged view showing a circle E of FIG. 1.
Figure 6:
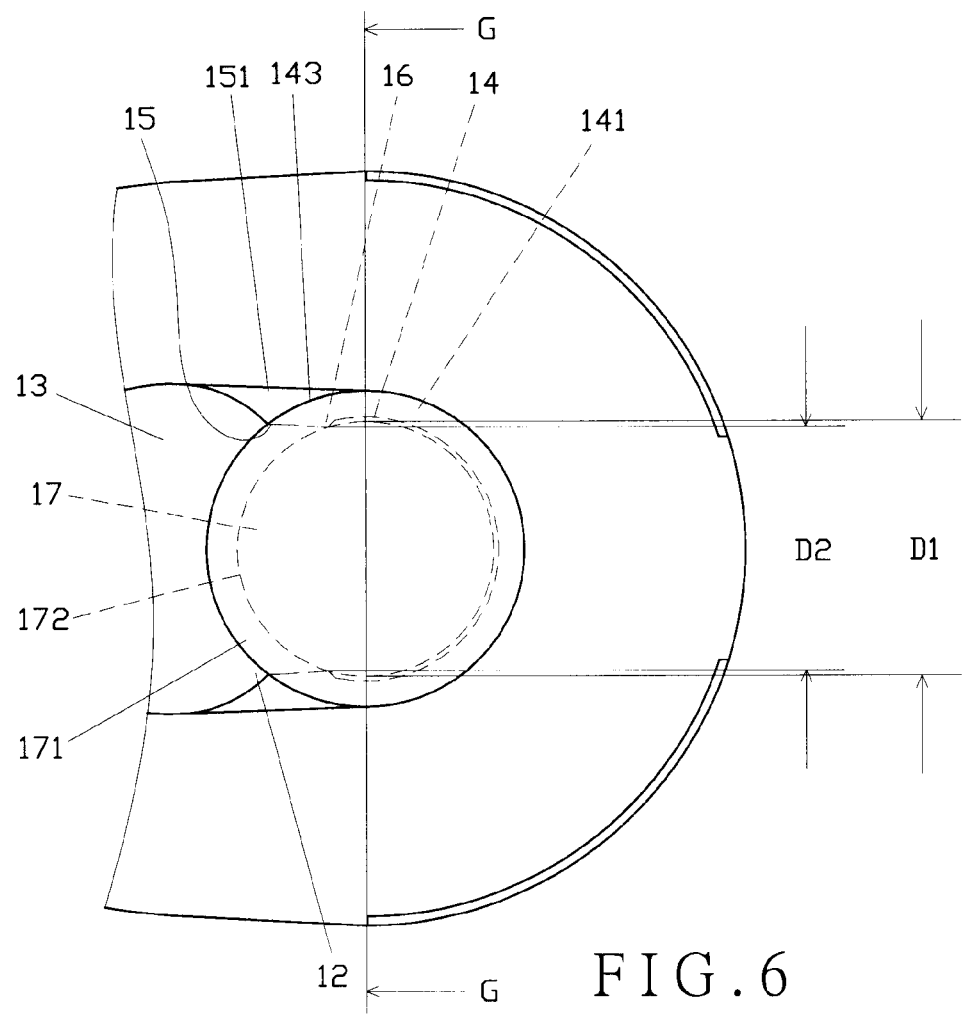
FIG. 6 is an enlarged view to show the first protrusion of the outer link plate engaged with the neck of the pin.

Referring to FIG. 1, a connection unit of a chain according to a first embodiment of the present invention comprises two outer link plates 1 and each outer link plate 1 includes a first hole 11 and a second hole 12. The second hole 12 includes a first recess 13 and a second recess 14 which communicates with the first recess 13. The first recess 13 has a diameter larger than that of the second recess 14. The second recess 14 includes an inner surface 142 and a stepped engaging surface 141 which is perpendicular to the inner surface 142. The first recess 13 and the second recess 14 have two opposite combined conjunction surfaces 15 each formed at the conjunction of two respective contact lines of the first and second recesses 13, 14. The combined conjunction surface 15 is formed at an intersection of the contact line of the first and second recesses 13, 14. The combined conjunction surface 15 is formed by a first conjunction surface 15A extending from the contact line of the first recess 13 to a second conjunction surface 15B which is inclined with respect to the first conjunction surface 15A, and extends to a first protrusion 16. A flat surface 151 is perpendicularly connected to each of the conjunction surfaces 15 and located at the conjunction of the two respective contact lines of the first and second recesses 13, 14. The flat surface 151 is higher than the engaging surface 141. A stop surface 143 is perpendicularly connected to the engaging surface 141. At least one first protrusion 16 extends from the inner surface 142. In this embodiment, there are two first protrusions 16 on the inner surface 142 of the second recess 14, as shown in FIG. 2. The first protrusions 16 are flush with the engaging surface 141. A pin 17 is fixed in the first hole 11 and includes an engaging portion 171. A neck 172 is located beside the engaging portion 171 and has a diameter smaller than a diameter of the engaging portion 171. The diameter "D1" of the neck 172 of the pin 17 is larger than a width "D2" between the two first protrusions 16, as shown in FIG. 6.

Figure 5:
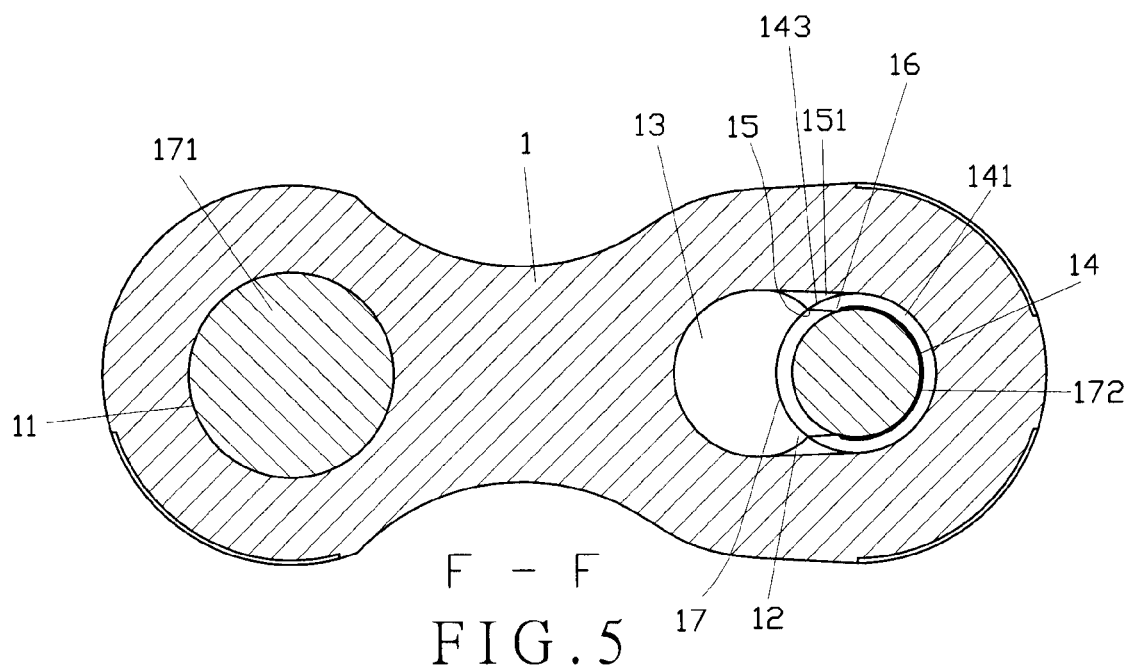
FIG. 5 is a cross sectional view taken along line F-F in FIG. 4.

Referring to FIGS. 3 and 4, the two pins 17 of the two outer link plates 1 are connected to two ends of a chain "C" and the two outer link plates 1 are connected to each other face to face. The engaging portion 171 of the pin 17 on one outer link plate 1 is inserted into the first recess 13 of the second hole 12 of the other outer link plate 1, and the engaging portion 171 of the pin 17 protrudes out from the outer link plate 1. The neck 172 of the pin 17 is then in contact with the flat surface 151 and the pin 17 is shifted from the first recess 13 to the second recess 14. Because the flat surface 151 is higher than the engaging surface 141, the engaging portion 171 simply protrudes slightly from the flat surface 151 to move over the two first protrusions 16 and enter into the second recess 14. When the neck 172 of the pin 17 contacts the first protrusions 16, the pin 17 is pushed continuously to move past the first protrusions 16 and enters into the second recess 14. The pin 17 is then pressed axially to let the engaging portion 171 contact against the engaging surface 141, and the engaging portion 171 is stopped by the stop surface 143 in a horizontal direction and cannot be shifted in the horizontal direction. The two first protrusions 16 are engaged with the neck 172, as shown in FIGS. 5 and 6. The neck 172 of the pin 17 cannot move in the horizontal direction so that the pin 17 does not disengage from the second recess 14. The neck 172 is engaged with the first protrusions 16 as shown in FIGS. 6 and 7, so that the chain "C" does not shift up and down or left and right during changing gears. The chain "C" generates less noise and impact and wearing.

Figure 9:
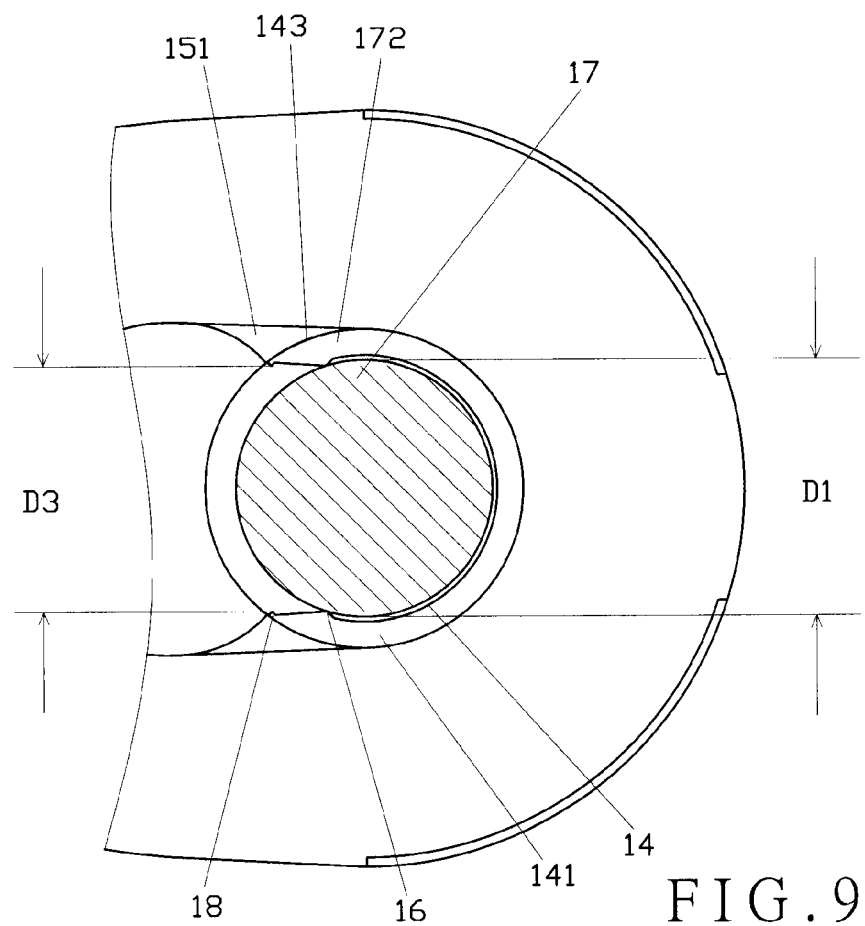
FIG. 9 is a cross sectional view to show the engagement of the first protrusion, the second protrusion and the pin according to the second embodiment of the present invention.

As shown in FIG. 8, a second embodiment of the present invention further includes a second protrusion 18 extending from at least one of the combined conjunction surfaces 15 and the diameter "D1" of the neck 172 of the pin 17 is larger than a width D3 between the two second protrusions 18 as shown in FIG. 9. The first protrusions 16 provide the first safety engagement with the neck 172, and the engaging portion 171 is stopped by the stop surface 143 so that the pin 17 does not shift horizontally. When the pin 17 is applied by an exterior torque, the engaging portion 171 protrudes axially and is not stopped by the stop surface 143. The neck 172 is disengaged from the first protrusions 16. The second protrusions 18 are used to engage with the neck 172 and avoid the pin 17 from disengaging form the outer link plate 1.

Figure 10:
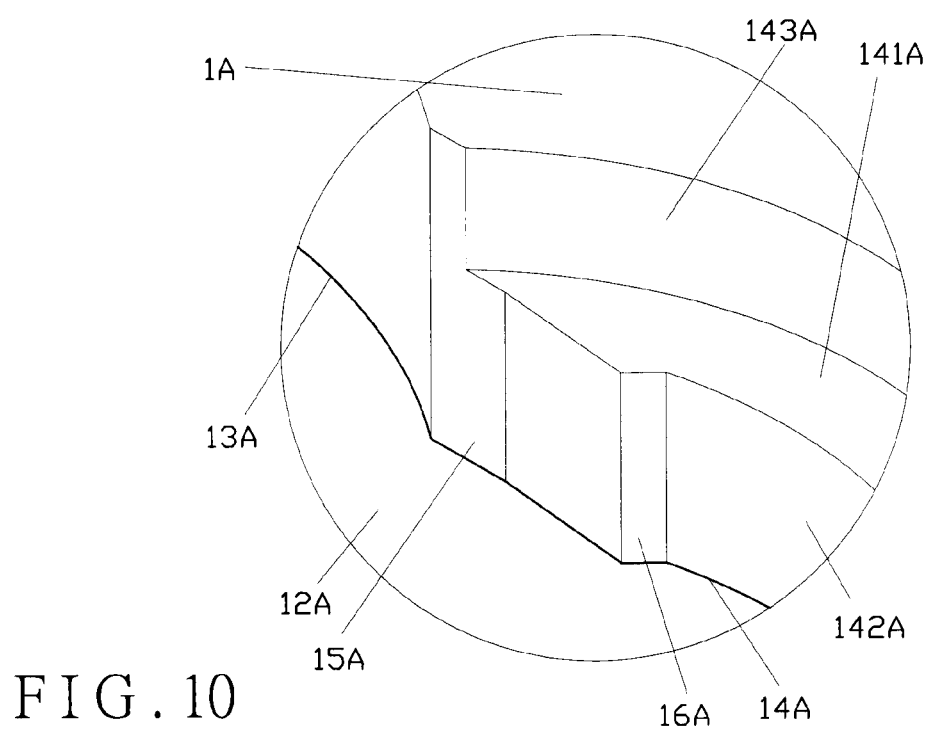
FIG. 10 is an enlarged view to show the first protrusion according to a third embodiment of the present invention.

FIG. 10 shows a third embodiment of the present invention, wherein the two outer link plates 1A each include a first hole and a second hole 12A. The second hole 12A includes a first recess 13A and a second recess 14A. The diameter of the first recess 13A is larger than that of the second recess 14A. The second recess 14A includes an inner surface 142A and a stepped engaging surface 141A which is perpendicular to the inner surface 142A. The first recess 13A and the second recess 14A have two conjunction surfaces 15A each formed at the conjunction of two respective contact lines of the first and second recesses 13A, 14A. A stop surface 143A is perpendicularly connected to the engaging surface 141A. At least one first protrusion 16A extends from the inner surface 142A.

Figure 11:
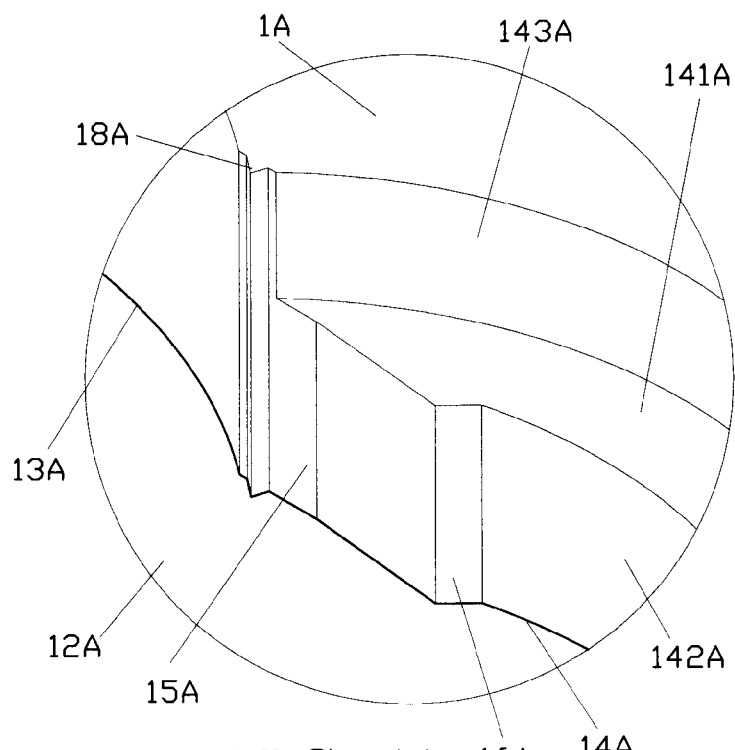
FIG. 11 is an enlarged view to show the first and second protrusions according to a fourth embodiment of the present invention.

FIG. 11 shows a fourth embodiment of the present invention, wherein a second protrusion 18A extends from at least one of the conjunction surfaces 15A and the diameter of the neck of the pin is larger than the width of the second protrusions 18A. Again, the first protrusions 16 and the second protrusions 18 provide two stages of stop to the neck so as to provide better safety to the chain.

Figure 12:
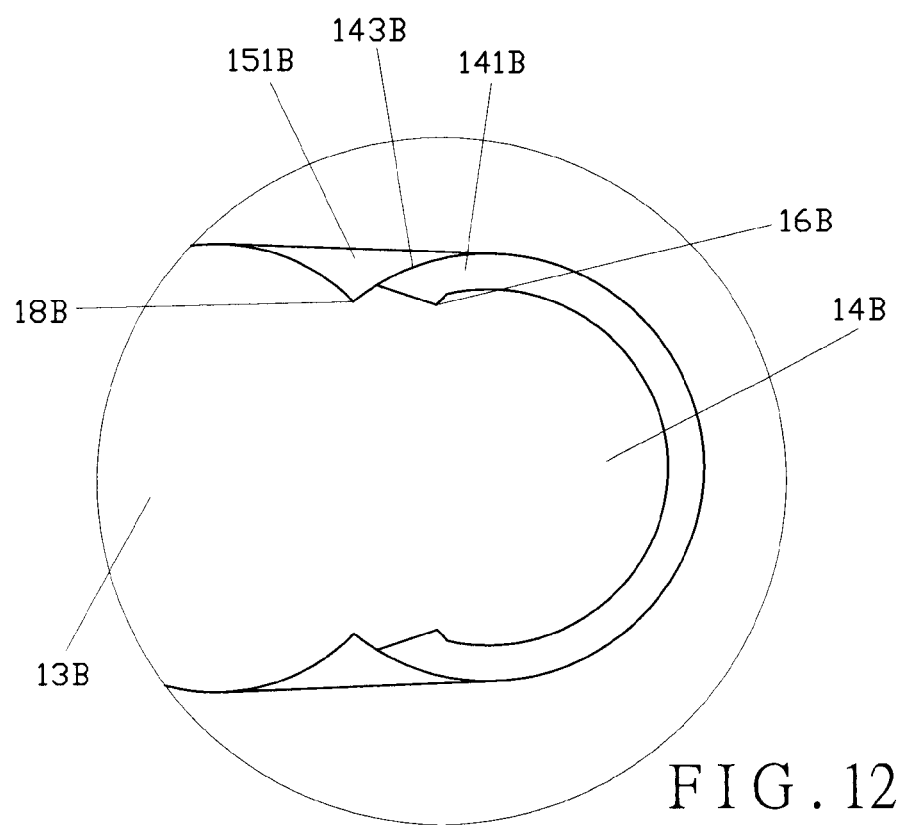
FIG. 12 is an enlarged view to show that the second protrusion is located at the conjunction of the two contact lines of the first recess and the second recess according to a fifth embodiment of the present invention.

FIG. 12 shows a fifth embodiment of the present invention, wherein there is no conjunction surface at the conjunction of two contact lines of the first and second recesses 13B, 14B. The second protrusions 18B are directly formed at the conjunction of the first and second recesses 13B, 14B. A flat surface 151B is formed on top of the second protrusion 18 and located at the conjunction of the two respective contact lines of the first and second recesses 13B, 14B. The flat surface 151B is higher than the engaging surface 141B. The engaging surface 141B is connected with the stop surface 143B. The two first protrusions 16B are engaged with the neck of the pin and the second protrusions 18B provide the second stage of safety to the neck.

Figure 13:
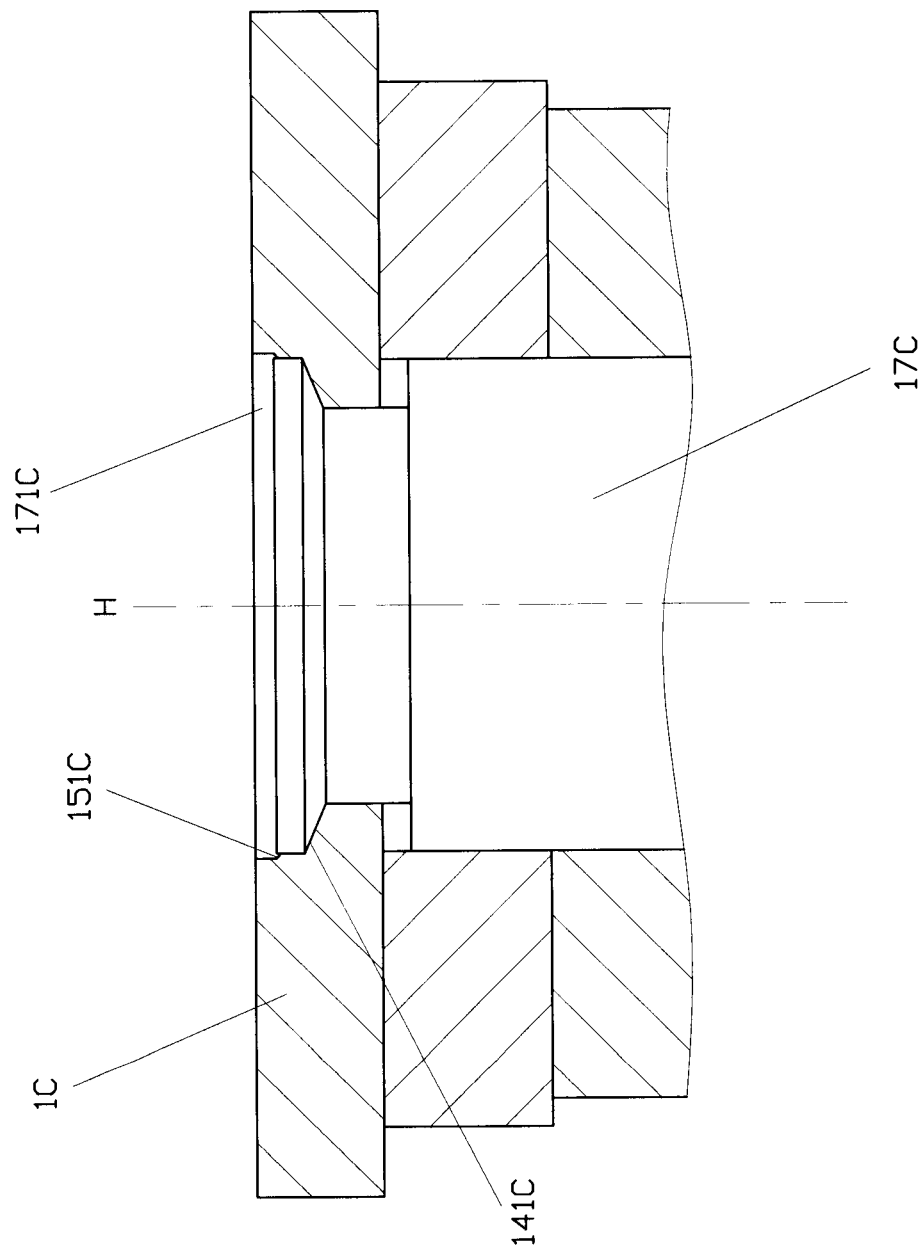
FIG. 13 is a cross sectional view showing the engagement of the flat surface, the engaging surface and the pin.
Figure 14:
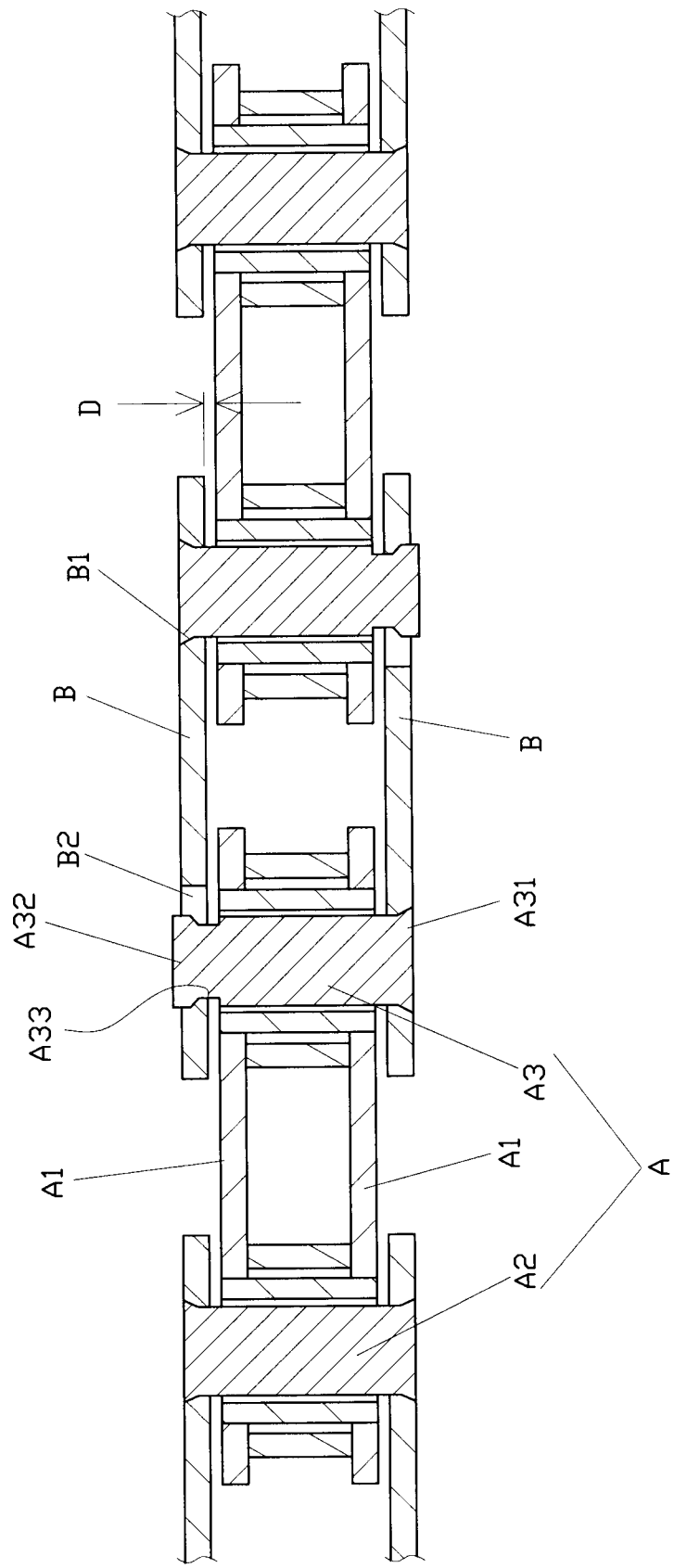
FIG. 14 is a cross sectional view of a conventional chain.
Figure 15:
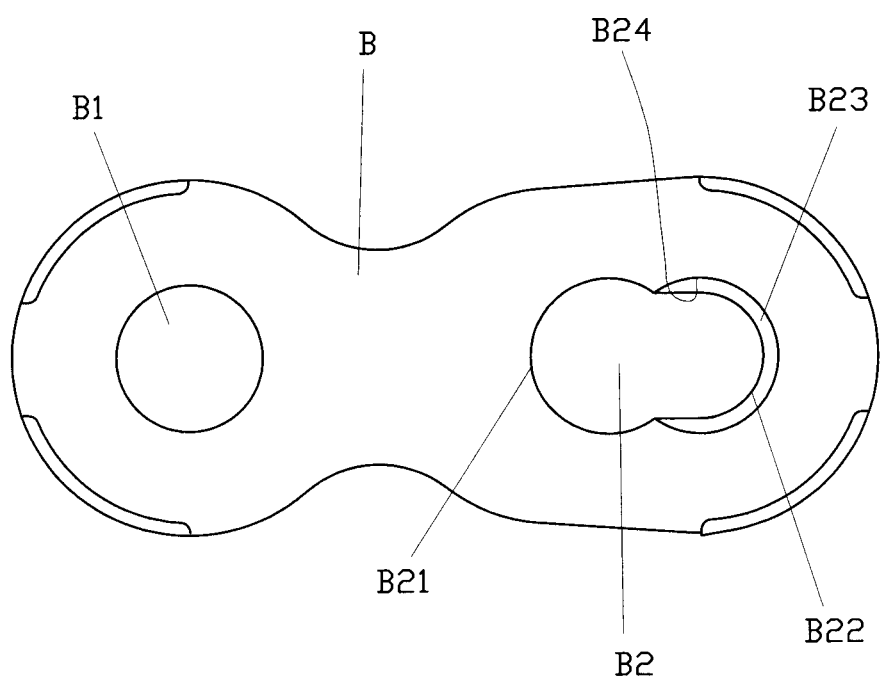
FIG. 15 is a side view of a conventional outer link plate.

FIG. 13 shows a sixth embodiment of the present invention, wherein the flat surface 151C of the outer link plate 1C is inclined and the engaging surface 141C is an inclined surface which faces the center "H" of the second recess. The bottom of the engaging portion 171C of the pin 17C is shaped to match with the inclined engaging surface 141C.

While we have shown and described the embodiments in accordance with the present invention, it should be clear to those skilled in the art that further embodiments may be made without departing from the scope of the present invention.

What is claimed is:

1. A connection unit of a chain, comprising:
   two outer link plates each having a first hole and a second hole, the second hole having a first recess and a second recess which communicates with the first recess, the first recess having a diameter larger a diameter of the second recess, the second recess including:
      an inner surface and a stepped engaging surface which is perpendicular to the inner surface;
      a stop surface perpendicularly extending from the engaging surface; and
      a combined conjunction surface formed at an intersection of a contact line of each of said first and second recesses, said combined conjunction surface forming a first conjunction surface extending from said contact line of said first recess to a second conjunction surface inclined with respect to said first conjunction surface and extending to a first protrusion, said first protrusion extending from the inner surface;
   a pin fixed in the first hole and including an engaging portion; and
   a neck located beside the engaging portion and having a diameter smaller than a diameter of the engaging portion.

2. The connection unit as claimed in claim 1, wherein the first recess and the second recess have two opposite combined conjunction surfaces each formed at the conjunction of two respective contact lines of the first and second recesses.

3. The connection unit as claimed in claim 2, wherein a flat surface is perpendicularly connected to the conjunction surfaces and located at the conjunction of the two respective contact lines of the first and second recesses, and the flat surface is higher than the engaging surface.

4. The connection unit as claimed in claim 3, wherein the flat surface is inclined.

5. The connection unit as claimed in claim 2, wherein at least one of the conjunction surfaces is formed with a second protrusion.

6. The connection unit as claimed in claim 5, wherein there are two first protrusions and the diameter of the neck of the pin is larger than a width between the two first protrusions.

7. The connection unit as claimed in claim 5, wherein a flat surface is perpendicularly connected to the conjunction surfaces and located at the conjunction of the two respective contact lines of the first and second recesses, and the flat surface is higher than the engaging surface.

8. The connection unit as claimed in claim 7, wherein the flat surface is inclined.

9. The connection unit as claimed in claim 5, wherein there are two second protrusions and the diameter of the neck of the pin is larger than a width between the two second protrusions.

10. The connection unit as claimed in claim 1, wherein a second protrusion extends from a conjunction between two respective contact lines of the first and second recesses.

11. The connection unit as claimed in claim 10, wherein a flat surface is formed on top of the second protrusion and located at the conjunction of the two respective contact lines of the first and second recesses, and the flat surface is higher than the engaging surface.

12. The connection unit as claimed in claim 11, wherein there are two second protrusions and the diameter of the neck of the pin is larger than a width between the two second protrusions.

13. The connection unit as claimed in claim 1, wherein the engaging surface faces a center of the second recess and is an inclined surface, and a bottom of the engaging portion of the pin is shaped to be engaged with the inclined engaging surface.

14. The connection unit as claimed in claim 1, wherein there are two first protrusions and the diameter of the neck of the pin is larger than a width between the two first protrusions.

* * * * *